(12) United States Patent
Maynard (10) Patent No.: US 6,677,938 B1
(45) Date of Patent: Jan. 13, 2004

(54) GENERATING POSITIONAL REALITY USING RTK INTEGRATED WITH SCANNING LASERS

(75) Inventor: Kurtis L. Maynard, Gainesville, GA (US)

(73) Assignee: Trimble Navigation, Ltd., Sunnyvale, CA (US)

( * ) Notice: Subject to any disclaimer, the term of this patent is extended or adjusted under 35 U.S.C. 154(b) by 0 days.

(21) Appl. No.: 09/369,033

(22) Filed: Aug. 4, 1999

(51) Int. Cl.[7] .............................................. G06T 15/00
(52) U.S. Cl. ........................ 345/419; 345/850; 701/207; 701/211
(58) Field of Search ..................... 386/46, 117; 348/61, 348/83, 135, 142, 232; 358/909.1; 345/7, 8, 207, 419, 850, 863; 340/988, 995; 701/207–209, 211; 702/150, 172; 239/161; 700/9, 83; 382/112, 152, 286; 356/3.11, 395, 601; 342/52, 54, 56, 58, 352, 357.06; 396/7

(56) References Cited

U.S. PATENT DOCUMENTS

| | | | |
|---|---|---|---|
| 4,928,169 A | * 5/1990 | Leberl et al. ................. 358/93 |
| 5,077,557 A | 12/1991 | Ingensand | |
| 5,212,738 A | * 5/1993 | Chande et al. ................. 382/8 |
| 5,233,357 A | 8/1993 | Ingensand | |
| 6,094,625 A | * 7/2000 | Ralston ....................... 702/150 |
| 6,107,944 A | * 8/2000 | Behr et al. .................. 340/995 |
| 6,169,526 B1 | * 1/2001 | Simpson et al. ............... 345/8 |
| 6,181,343 B1 | * 1/2001 | Lyons ......................... 345/358 |
| 6,282,362 B1 | * 8/2001 | Murphy et al. ............... 386/46 |

* cited by examiner

Primary Examiner—Mano Padmanabhan
Assistant Examiner—Lance W. Sealey
(74) Attorney, Agent, or Firm—Boris G. Tankhilevich (57) ABSTRACT

A method and a system for creating a Positional Reality scene of a plurality of real objects that represents a virtual reality scene with the correct positional information about real objects are disclosed. A Positioning Reality Image of each geometrical object is built by using an integrated Satellite Positional System (SATPS), and a Scanning Laser Sensor (SLS). If SATPS comprises an RTK GPS system, a Positioning Reality Image of each geometrical object is built in real time.

4 Claims, 7 Drawing Sheets

Passing the GPS / Laser System Creates the Bottom Image. Every Dot on the Image has a Latitude, Longitude and Height. This Image was Created with 3 Seconds of Data Traveling at 40 mph.

GENERATING POSITIONAL REALITY USING RTK INTEGRATED WITH SCANNING LASERS

BACKGROUND

Computer games and simulators have introduced the term "Virtual Reality" to our vocabularies. Virtual Reality is the concept of viewing scenes in three dimensions giving the viewer the feeling of being in the scene. Many of the Virtual Reality Scenarios are done with imagery, with no dimensional or positional integrity.

On the other hand, in a real time simulator, the dimensional or positional integrity of an image can become very important. Indeed, if a simulator's job is to simulate driving the Indy 500, then the track, wall locations etc. need to have the correct dimensions. The same is true if you want to play a simulated hole of Golf at Augusta, you would like the fairways and greens to have the look and feel of the real Golf Course.

Conventional survey techniques as well as Real Time Kinematic Global Positioning System (RTK GPS) surveys are unable to provide in a cost-effective manner information necessary to build images of a real object with positional integrity.

What is needed is a method for creating a Positional Reality scene of a plurality of real objects that represents a virtual reality scene of a plurality of real objects that has the correct positional information about real objects.

SUMMARY

The present invention is novel and unique because it provides a method for creating a Positional Reality scene of a plurality of real objects that represents a virtual reality scene with the correct positional information about real objects.

The idea of this patent application is to combine a Positioning System, for instance, an RTK GPS, and a Scanning Laser Sensor (SLS) as a means to build images of surfaces of real objects cost effectively with preservation of correct positional information about the real objects.

One aspect of the present invention is directed to a method of generating at least one Positional Reality Image (PRI) of at least one real object using an integrated Positional Reality (PR) system comprising a Positioning System integrated with a Scanning Laser Sensor (SLS). Each Positional Reality Image (PRI) is generated as an image of one real object.

In one embodiment, the method comprises the following steps: (a) collecting data of each real object; and (b) storing the data.

The stored data can be utilized to generate one Positional Reality Image (PRI) of this real object.

In one embodiment, the step (a) of collecting data of one geometrical object in real time further includes the steps of: (a1) measuring a current position of the moving platform using the Positioning System (PS); and (a2) making current measurements of each point of the real object utilizing the Scanning Laser Sensor (SLS).

In one embodiment, the step (b) of generating the current Positional Reality Image (PRI) of one real object further includes the steps of: (b1) combining the real time data of the moving platform and the synchronized positional data of the real object; (b2) presenting the current Positional Reality Image (PRI) to the operator; and (b3) generating and presenting subsequent Positional Reality Images (PRI) of one real object as the operator navigates around the site.

In one embodiment, a plurality of Positional Reality Images (PRI) of each real object generated for each position of the moving platform can be stored in a database.

In one embodiment, the data stored in the database can be used to build a virtual image of each real object as a cloud of three-dimensional points covering the surface (painting the surface) of that geometrical object. In this embodiment, the cloud of three-dimensional points represents a laser photograph of the geometrical object.

Another aspect of the present invention is directed to a method of navigating around a real site using a database of three dimensional virtual objects, wherein each three dimensional geometrical virtual object comprises a three dimensional virtual image of one three dimensional real object.

In one embodiment, the method of navigating around the real site comprises the following steps: (a) generating the database of each three dimensional geometrical virtual object; (b) viewing the database of at least one three dimensional geometrical virtual object; and (c) navigating around the real site using each three dimensional geometrical virtual object stored in the database.

In this embodiment, the user can navigate around the real site in real time in complete darkness without using the night vision gear.

Yet, one more aspect of the present invention is directed to a method of identifying a three dimensional point on a three dimensional real object by utilizing a three dimensional Positional Reality Image (PRI) of the geometrical object;

In one embodiment, the method of identifying a three dimensional point on a three dimensional real object comprises the following steps: (a) generating the three dimensional Positional Reality Image (PRI); (b) generating a matching database, wherein each three dimensional point on the three dimensional real object is matched with a single three dimensional point on the three dimensional Positional Reality Image (PRI) of this geometrical object; (c) viewing the three dimensional Positional Reality Image (PRI); (d) selecting a three dimensional point on the three dimensional Positional Reality Image (PRI); and (e) identifying a corresponding three dimensional point of the three dimensional real object by using the matching database.

PULL DESCRIPTION OF THE PREFERRED EMBODIMENTS

Figure 1:
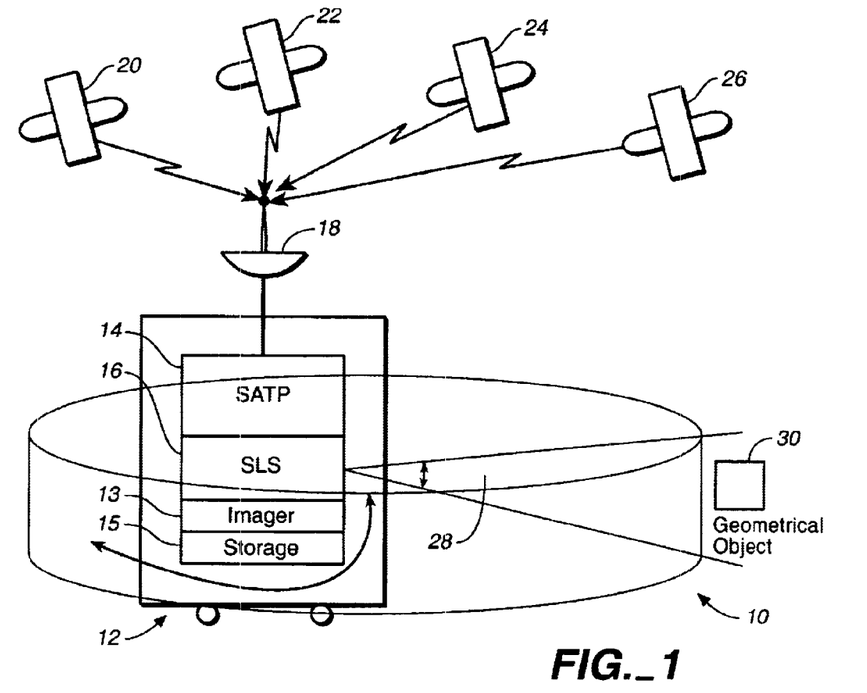
FIG. 1 depicts an integrated Positional Reality (PR) system comprising a Satellite Positioning System (SATPS) integrated with a Scanning Laser Sensor (SLS) in order to create a Positional Reality Image (PRI) of a geometrical object.

FIG. 1 depicts an integrated Positional Reality (PR) system (10) comprising a Satellite Positioning System (SATPS) (14) integrated with a Scanning Laser Sensor (SLS) (16) in order to create a Positional Reality Image (PRI) of a geometrical object (30).

Reference to a Satellite Positioning System or SATPS herein refers to a Global Positioning System (GPS), to a Global Orbiting Navigation System GLONASS), and to any other compatible satellite-based system that provides information by which an observer's position and the time of observation can be determined, all of which meet the requirements of the present invention.

The GPS is a system of satellite signal transmitters that transmits information from which an observer's present location and/or the time of observation can be determined. The GLONASS can operate as an alternative or supplemental system.

The GPS was developed by the United States Department of Defense (DOD) under its NAVSTAR satellite program. A fully operational GPS includes more than 21 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency $f1=1575.42$ MHz (nineteen centimeter carrier wavelength) and an L2 signal having a frequency $f2=1227.6$ MHz (twenty-four centimeter carrier wavelength). These two frequencies are integral multiplies $f1=1,540$ $f0$ and $f2=1,200$ $f0$ of a base frequency $f0=1.023$ MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes is described below.

Use of PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal receivers operated by users.

A first known PRN code for each GPS satellite, sometimes referred to as a precision code or P-code, is a relatively long, fine-grained code having an associated clock or chip rate of $f0=10.23$ MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of $f0=1.023$ MHz. The C/A -code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats.

Accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9\ k/16)$ GHz and $f2=(1.246+7\ k/16)$ GHz, where k ($=1,2,\ldots 24$) is the channel or satellite number. These frequencies lie in two bands at 1.597–1.617 GHz (L1) and 1,240–1,260 GHz (L2). The L1 signal is modulated by a C/A-code (chip rate=0.511 MHz) and by a P-code (chip rate=5.11 MHz). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites.

The range ($r_i$) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver estimates a pseudo-range ($pr_i$) (not a true range) to each satellite.

After the SATPS receiver determines the coordinates of the i-th SATPS satellite by demodulating the transmitted ephemeris parameters, the SATPS receiver can obtain the solution of the set of the simultaneous equations for its unknown coordinates ($x_0$, $y_0$, $z_0$) and for unknown time bias error (cb). The SATPS receiver can also determine velocity of a moving platform.

Differential Global Positioning System (DGPS) is a technique that significantly improves both the accuracy and the integrity of the Global Positioning System (GPS).

The differential GPS receiver can include: (a) a real time code differential GPS; (b) a post-processing differential GPS; (c) a real-time kinematic (RTK) differential GPS that includes a code and carrier RTK differential GPS receiver.

The differential GPS receiver can obtain the differential corrections from different sources.

The differential GPS receiver can obtain the differential corrections from a Reference (Base) Station. The fixed Base Station (BS) placed at a known location determines the range and range-rate measurement errors in each received GPS signal and communicates these measurement errors as corrections to be applied by local users. The Base Station (BS) has its own imprecise clock with the clock bias CBBASE. As a result, the local users are able to obtain more accurate navigation results relative to the base station location and the base station clock. With proper equipment, a relative accuracy of 5 meters should be possible at distances of a few hundred kilometers from the Base Station.

The differential corrections can be obtained from the Wide Area Augmentation System (WAAS). The WAAS system includes a network of Base Stations that uses satellites (initially geostationary satellites -GEOs) to broadcast GPS integrity and correction data to GPS users. The WAAS provides a ranging signal that augments the GPS, that is the WAAS ranging signal is designed to minimize the standard GPS receiver hardware modifications. The WAAS ranging signal utilizes the GPS frequency and GPS-type of modulation, including only a Coarse/Acquisition (C/A) PRN code. In addition, the code phase timing is synchronized to GPS time to provide a ranging capability. To obtain the position solution, the WAAS satellite can be used as any other GPS satellite in satellite selection algorithm.

The WAAS provides the differential corrections free of charge to a WAAS-compatible user. The accuracy of this method is less than 1 meter.

The real time kinematic (RTK) differential GPS receiver can be used to obtain the position locations with less than 2 cm accuracy. The RTK differential GPS receiver receives the differential corrections from a Base Station placed in a know location within (10–50) km from the local user.

For the high accuracy measurement, the number of whole cycle carrier phase shifts between a particular GPS satellite and the RTK GPS receiver is resolved because at the receiver every cycle will appear the same. Thus, the RTK GPS receiver solves in real time an "integer ambiguity" problem, that is the problem of determining the number of whole cycles of the carrier satellite signal between the GPS satellite being observed and the RTK GPS receiver. Indeed, the error in one carrier cycle L1 (or L2) can change the measurement result by 19(or 24) centimeters, which is an unacceptable error for the centimeter-level accuracy measurements.

Thus, in the preferred embodiment, the Positional Reality (PR) system (10) of FIG. 1 includes a real-time kinematic (RTK) GPS system(14) integrated with a Scanning Laser Sensor (SLS) (16), a storage memory (15) configured to store a set of data representing each real object; and (13) an imager configured to utilize the set of data stored in the storage memory in order to generate at least one Positional Reality Image (PRI) of at least one real object. (The full description of the SLS system is given below).

In one embodiment, the Positional Reality (PR) system (10) of FIG. 1 is mounted on a moving platform (12 of FIG. 1).

In one embodiment, the storage system (15 of FIG. 1) is implemented using a standard ORACLE database system.

In one embodiment, the imager (13) of FIG. 1 is implemented using a computer and a see-through display, or a telemonitor, or a laptop computer. The operator can view the current Positional Reality Image (PRI) on a see-through display, on a telemonitor, or on a laptop computer. (See discussion below).

The usage of the RTK GPS as a Satellite Positioning System (SATPS) allows the user to achieve the centimeter level of accuracy in the position determination of the mobile object as often as 10 times a second.

In one embodiment, the SLS system (16) of FIG. 1 includes a rotating laser system with a scanning feature. In this embodiment, the laser beam (28) of FIG. 1 can be generated using a rotating laser system with a scanning feature.

Rotating lasers were introduced about twenty-five years ago. The rotating laser system can be implemented when a laser spins in the horizontal plane, or Z-plane, and provide an accurate reference plane with millimeter-precision. The rotating laser emits a laser beam. The rotating laser beam can be rotated mechanically or optically. In the mechanic embodiment, the motor physically rotates the laser and accordingly the laser beam. In the optical embodiment, the mirror rotates in such a way that the physically non-rotating laser emits the rotating laser beam.

A fan (scan) laser system generates a continuously scanning laser beam in vertical plane within a certain angle window. The scanning laser beam can be scanned mechanically or optically. In the mechanic embodiment, the motor physically scans the laser and accordingly the laser beam. In the optical embodiment, the mirror scans in such a way that the physically non-scanning laser emits the scanning laser beam.

The scanning laser system can be used to measure the angular coordinates and distance from the laser scan to the target. One application is a robotics vision, another application is a collision avoidance system.

The SchwartzElectro Optics (SEO), Orlando, Fla., manufactures scanning (fan) laser systems.

Laser Systems, Inc., located in Pleasanton, Calif., manufactures a smart rotating laser system RL-S1A with a scanning feature. The user can receive the laser beam with the SmartCard target and draw the scan to any width for optimum beam brightness. This laser system has 633 nm visible diode as a laser source. The horizontal self leveling range is (+/−) 10 arc minutes. The vertical self leveling range is also (+/−) 10 arc minutes. The horizontal accuracy is (+/−) 15 arc seconds. The vertical accuracy is (+/−) 20 arc seconds. Operating range (diameter) with scanning target is 200 ft (60 m), with LS-50B receiver is 100 ft (300 m).

Figure 3:
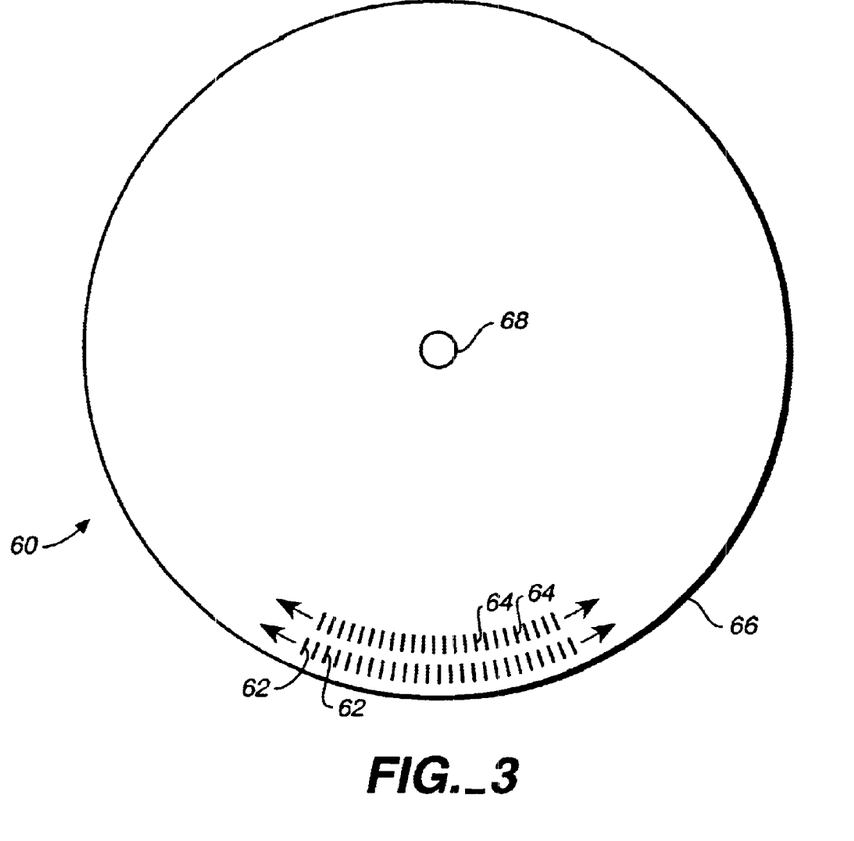
FIG. 3 illustrates a disk internal to the rotary encoder.
Figure 3A:
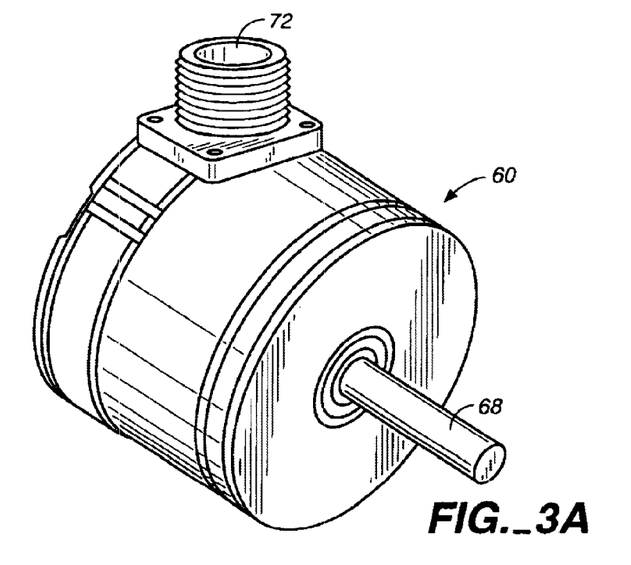
FIG. 3A depicts a rotary encoder including a shaft and an output terminal.

In one embodiment, the angular coordinates of surface of a geometrical object at the time of the illumination by the SLS laser beam can be determined by using two conventional rotary encoders. One such encoder (60) is shown in FIG. 3. The encoder (60) employs a conventional light emitting diode/photodetector combination as described below. The encoder (60), as shown in FIG. 3A, includes a shaft (68) and an output terminal (72). The rotary encoder of FIGS. 3 and 3A is manufactured by Dynamics Research Corporation.

In typical operation, the shaft (68) is attached to a device (not shown) of which it is desired to measure the rotational motion. In response to rotation of the device attached to shaft (68), output signals are generated via the output terminal (72) indicative of the motion. As known by those skilled in the art, to track this rotary motion, a disk internal to the rotary encoder (60) is provided. A typical disk (66) is shown in FIG. 3. The disk (66) is attached to the shaft (68) of the encoder so that it rotates with the shaft (68). The disk (66) is typically glass engraved via conventional IC lithography technique to include a plurality of lines (62) and (64). The arrows indicate that the lines (62) and (64) extend entirely around the circumference of the disk (66). A light emitting diode (not shown) is arranged on one side of the disk (66) and a photodetector (also not shown) is positioned on the other side. The light emitting diode/photodetector combination is fixed and does not rotate with the disk (66). As the device attached to the shaft (68) is rotated, the disk (66) also rotates and the lines (62) successively pass between the light emitting diode and photodetector inducing output signals indicative of the passing lines. Each line is equivalent to one cycle. With regard to the encoder shown in FIG. 3A, a disk of 3.5 inches in diameter can be used. Although disks can be provided with a various number of lines, the maximum number of lines available for this size and type of rotary encoder is in the range of 9000 lines (the lines (62) and (64) of FIG. 3 not being to scale). This is also referred to as the "count" of the encoder and results in a maximum of 9000 cycles per shaft revolution.

Figure 4:
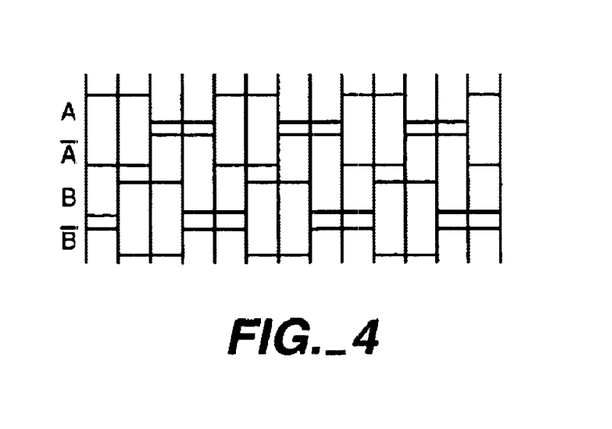
FIG. 4 shows the typical outputs for the rotary encoder of FIGS. 3 and 3A.

FIG. 4 shows the typical outputs for the rotary encoder (60) of FIGS. 3 and 3A. Although various output configurations can be provided, channels A and B (as well as their complementary channels) provide the primary outputs of the encoder (60) and can alternatively be generated in a sine wave form. Output A is generated by the lines (62) in FIG. 3 as described above. Output B is generated by a second light emitting diode/photodetector combination sensing a second set of lines (64) shown in FIG. 3. This second set of lines (64) is identical to the first set of lines (62) except that it is 90 degrees out of phase from the first set of lines (62). Accordingly, output B is simply output A shifted by 90 degrees or a quadrature wave form of output A. By having two output wave forms of the same frequency which are 90 degrees out of phase, it is possible to determine the direction of motion of the disk (66). and, therefore, the device attached to disk (66). This is conventionally accomplished by providing the A and B signals as the "D" and "CLOCK" inputs, respectively, of a D flip-flop. As a result, if the Q output line is high, the disk is being rotated counterclockwise. Since the output on channels A and B provide 9000 cycles per shaft revolution, one cycle can be provided every 0.04 degree of rotation.

As known by those skilled in the art, internal and/or external cycle interpolation can be added to increase the number of counts per revolution. With regard to the specific rotary encoder shown in FIG. 3A, for example, so-called external four times circuitry can be added to provide 36,000 counts per revolution, and internal ten times circuitry and external four times circuitry can be added to provide 360,000 counts per revolution. This type of circuitry, which can conventionally be added to any type of encoder, adds considerable expense and complexity to the encoder.

Referring back to FIG. 1, the first encoder of the type described as the encoder (60) of FIG. 3 can be used for measuring the horizontal angular coordinate of the surface of the geometrical object (30) and the second encoder of the type described as the encoder (60) of FIG. 3 can be used for measuring the vertical angular coordinate of the surface of the geometrical object (30).

In this embodiment, the shaft (68) of the first encoder is attached to the rotating means of the laser beacon, wherein the shaft of the second encoder is attached to the scanning means of the laser beacon. The laser beacon provides the rotating and scanning laser beam that passes the lines (62) of each encoder in one direction, wherein the reflected from the mobile unit laser beam passes the lines (62) of each encoder in the other direction and can be detected by the photodetector. As was described above, the photodetector output signals are indicative of the passing lines. For each encoder, each line is equivalent to one cycle. Thus, both encoders can be used to provide the vertical and horizontal angular coordinates of the geometrical object (30 of FIG. 1) at the time of illumination by the rotating and scanning laser beam respectively.

The distance between the laser beacon and the geometrical object (30 of FIG. 1) at the time of illumination can be determined by the simple computation. Indeed, having a clock at the laser beacon one can determine the time period that laser beam spent travelling between laser beacon and the geometrical object back and forth. Dividing this time period by two and multiplying by the speed of light, one can determine the distance between the laser beacon and each geometrical object being illuminated.

For relative measurements in the horizontal plane, there is no need for initialization. However, for absolute measurement in the horizontal plane, the user has to initialize measurement to tie the reference horizontal angle to the measured angular coordinate of each geometrical object.

In the vertical plane there is no need for initialization. However, the user should calibrate the laser beam to get a reference point in order to get rid of the system errors.

The signal processor (not shown) utilizes the data provided by optical encoders and the clock (not shown) and the time of illumination to calculate the three-dimensional coordinates for each geometrical object.

In another embodiment, the SLS system (16) of FIG. 1 includes a scanning laser described in the U.S. Pat. No. 5,546,188 "Intelligent vehicle highway system sensor". The '188 patent is incorporated in this patent application in its entirety.

The '188 patent relates generally to object sensors and related methods. In particular, the '188 patent discloses the generation of three dimensional images of objects by rotating or scanning a laser beam rangefinder, operating at a high pulse rate, in a plane where there is relative motion between the rangefinder and the object to be sensed or imaged in a direction perpendicular to the laser beam plane of rotation. This operation causes the laser rangefinder rotating beam, when passing to a side of the object, to cover the object to be sensed with rangefinder pulses, and thereby, obtain a three dimensional image of the object.

In one embodiment, the three dimensional object sensor of patent '188 was used for the sensing trees formed in a row for purposes of spraying, counting or measuring the size of the trees. The sensor was moved along the ground traveling between rows of trees, crops or foliage with the laser rangefinder scanning on either side of the moving vehicle carrying the sensor in a plane perpendicular to the motion of the vehicle. When the sensor detected the presence of foliage, it provided a signal activating a spraying system for the efficient spraying of the tree or object being sensed.

In the preferred embodiment of '188 patent, the SLS sensor comprises a forward and a backward beam emitted by the laser means. The forward and backward beams are separated by a predetermined angle and are emitted toward a fixed area through which the vehicle travels. A time signal representative of a travel time for a point on the vehicle to travel between the beams is determined from time-of-flight data provided by the range data processing means. A single transmitter and receiver pair is used in a preferred embodiment of the '188 patent.

In an alternate embodiment of the '188 patent, a SLS sensor further comprises two transmitters for emitting a pair of laser beams, means for directing the beams toward zones on a roadway traveled on by the vehicle, and two receivers for converting reflected laser beams from the vehicle to signal voltages, the signal voltages representative of ranges between the receivers and defined points on the vehicle.

The '188 patent further provides for scanning of laser beams using an optically reflective surface, intercepting the beams, and reflecting the beams at predetermined angles from a perpendicular to the roadway. The beams reflected off of the vehicle are directed back toward the mirror into corresponding apertures of the receivers. Means are provided for rotatably moving the reflective surface across a reflective angle sufficient for reflecting the beams across a transverse portion of the vehicle, and signal means representative of the sensor angle within the beam plane are also provided. The angle signals are delivered to the processing means for providing range data at corresponding angles and the range and angle data in combination provide a transverse profile of the vehicle.

In one embodiment of the '188 patent, the laser beam scanning means utilizes a mirror intercepting the beam emitted from the transmitter and reflecting the beam onto scanning planes. The planes are set at opposing angles from a perpendicular to the roadway. The reflected beam directed back toward the mirror is directed into corresponding apertures of the receiver. A motor having a rotatable shaft is affixed to the mirror for continuously rotating the mirror about the axis, and an encoder is affixed to the motor shaft for identifying an angular position of the mirror relative to a reference angle.

In the preferred embodiment of the '188 patent, the processing means comprises a microprocessor programmed to receive respective range and sensor angle data for storing and processing the data for a scanned cycle associated with a timing signal. The processed data results in a three dimensional shape profile for the vehicle.

The '188 patent further discloses a scanning laser radar system to develop a range map of an area being viewed. Two dimensions are provided by the scanning pattern and a third dimension is provided by the range measurements themselves. A profile of the vehicle was determined by using range reading taken in a transverse direction across the vehicle.

The following discussion illustrates one of the embodiments that can be used to implement the Scanning Laser Sensor (SLS) (16 of FIG. 1) that is used in the current patent application to build the Positional Reality Image (PRI) of the geometrical object (30 of FIG. 1).

Figure 5:
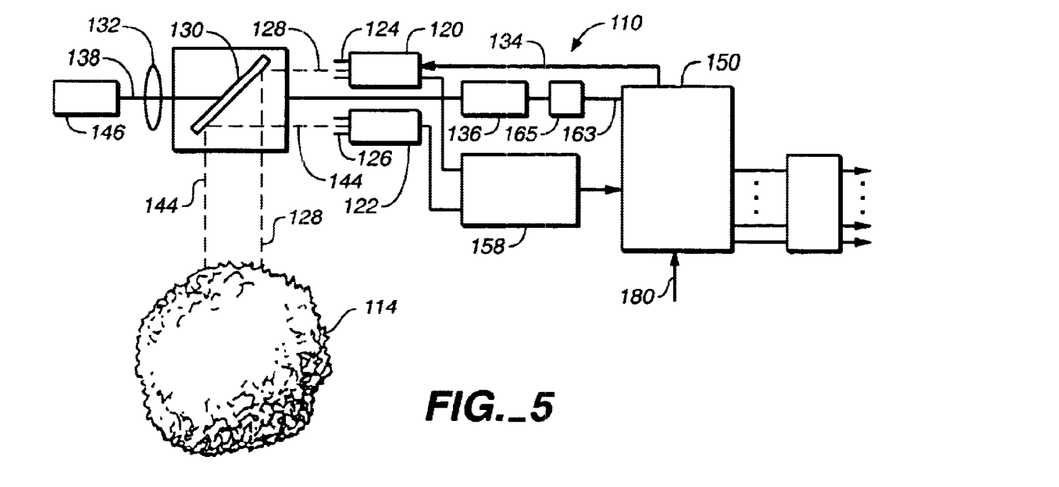
FIG. 5 depicts a schematic diagram of the Scanning Laser Sensor (SLS).

The sensor (110) as illustrated in FIG. 5 employs a pulsed time-of-flight range measuring system. A laser transmitter (120) and optical receiver (122) having separate apertures (124) and (126) respectively are placed side-by-side as illustrated in FIG. 5. The transmitted laser beam (128) and receiver (122) field-of-view are continuously scanned by a rotating mirror (130) in a vertical plane (132) which is perpendicular to a travel axis (134) of a geometrical object (112) upon which the sensor (110) is affixed.

As shown in FIG. 5, the position of the mirror (130) and correspondingly, the laser beam (128) is determined by means of a shaft encoder (136) affixed to the mirror drive motor shaft (138). With this configuration, a single sensor (110) makes measurements of ranges between the sensor (110) and a geometrical object (114) as the sensor travels around.

Figure 5A:
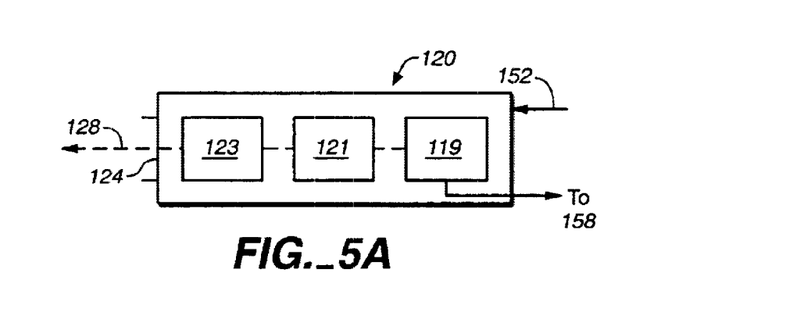
FIG. 5A shows a schematic diagram of the laser transmitter illustrating the relationship between the laser device and the lens/prism system.

As illustrated in FIG. 5A, the laser transmitter (120) utilizes a lens system and a circuitry employing a diode laser (119) as an optical source.

EXAMPLE I

A conventional InGaAs strained layer quantum-well-structure injection laser (119) configured in a pulsed circuit can be used to emit 13 nanosecond pulses having a peak radiant flux of approximately thirty watts at 0.91 microns. The diode laser (119) can be driven with fifty amp current pulses generated by an avalanche-transistor pulser well known in the art. The 381 micron laser (119) diode junction emits radiation into a 10 by 40 solid angle. A fast focal length (f:0.91) multi element lens (121) having an effective focal length of, for example, on the order of 8.8 millimeters can be used to collimate the diode laser emission, resulting in a beam divergence of 46.6 miliradians parallel to the diode junction and 0.12 miliradians perpendicular to the diode junction. The collimated laser beam is expanded by a factor of six in the direction parallel to the diode junction using an anamorphic prism (123) pair resulting in a 7.8 miliradians parallel and 0.12 miliradians beam divergence for the laser beam (1 28) emitted through the aperture (124).

Figure 5B:
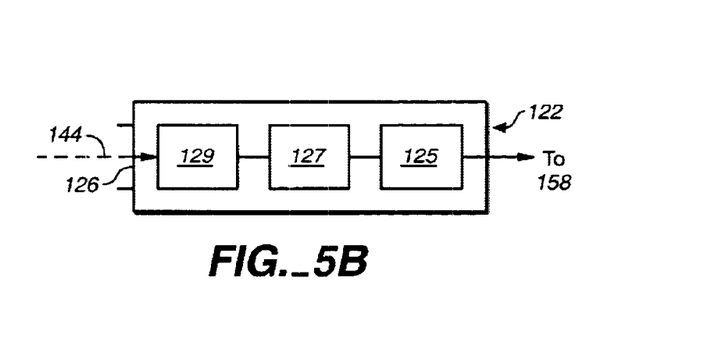
FIG. 5B is a schematic diagram of the optical receiver illustrating the relationship of the receiving objective lens and the photodiode converting the optical signal to current pulses.

FIG. 5B illustrates an optical receiver (122) that utilizes a lens system and circuitry in order to receive an optical return radiation representing the reflected laser beam (144) incident upon the objective lens (129) and focused onto the receiver's (122) photodiode (127).

EXAMPLE II

The optical receiver (122) comprises an objective lens (129) and a silicon PIN photodiode (127) receiving the laser beam (144) at its aperture 26 after it has been reflected from the target (114). A conventional transimpedance amplifier (125) converts the photodiode current pulses to voltage pulses. Optical return radiation representing the reflected laser beam (144) incident upon the objective lens (129) is focused onto the receiver (122) photodiode (127). The receiver field-of-view is given by the ratio of the photodiode (127) diameter to the receiver lens (129) focal length and, by way of example, may be on the order of 13 miliradians. This value is sufficiently large to facilitate bore sighting the receiver (122) to the 7.8 miliradians transmitter beam width.

Referring back to FIG. 5, the shaft encoder (136) pulses the laser (119) at a preselected pulse rate.

EXAMPLE III

If the shaft encoder (136) pulses the laser (119) at a preselected pulse rate on the order of 2,048 pulses per revolution, range measurements can be made at every 3.06 miliradians about the axis (138) of the mirror rotation. With a motor (146) providing the mirror (130) rotation rate of 40 revolutions per second (rps), the laser pulse repetition rate is at 81.92 thousand cycles per second (kHz).

The microprocessor (150 of FIG. 5) controls the triggering of the laser transmitter (120) by sending pulse trigger signals (152) which are selected to limit the laser (120) operation to quadrants of rotation on the left and right sides.

Referring to FIG. 5, the sensor (110) determines a range to the target geometrical object (114) by measuring the time for one emitted pulse as it leaves the laser transmitter (120) and returns to be detected by the optical receiver (122). This round trip time is divided by two to obtain the time to travel to the target geometrical object (114) and multiplied by the speed of light, the speed of the laser beam (128). An accurate measure of the range to the target geometrical object (114) is required and thus an accurate measurement of the time is needed. To this end, the sensor system (110) includes a range measurement circuit (158). This range measurement circuit (158) is optically coupled to the laser (119) as means for initiating a start pulse for the range gate. A stop pulse for the range measurement circuit (158) is provided by a threshold detector contained within the receiver (122).

As shown in FIG. 5, the microprocessor (150) is programmed to perform sensing and calculating the shape of the geometrical objects.

Figure 6:
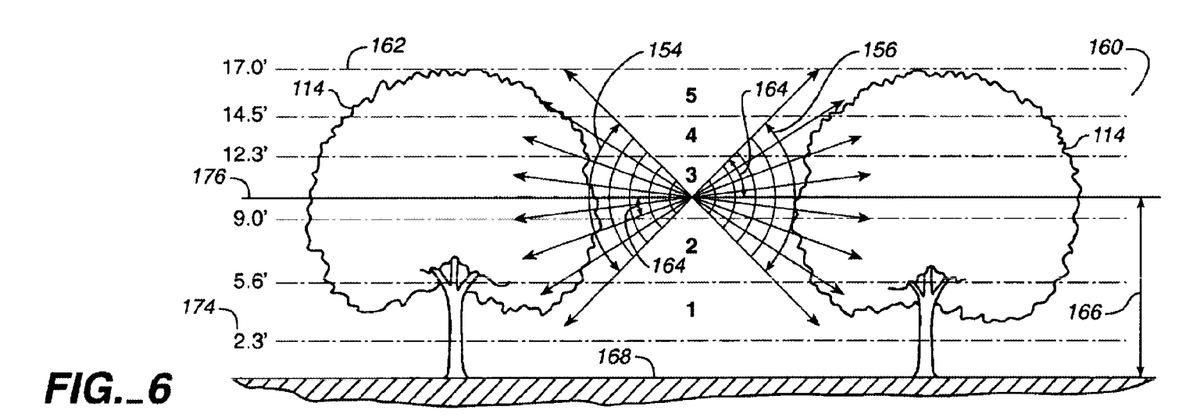
FIG. 6 illustrates how to determine the geometrical relationship between the SLS of FIG. 5 and the target object.

As depicted in FIG. 6, the sensor (110 of FIG. 5) is used to calculate the height of the target tree (114), the range to this object, an angle (164) associated with that range, and the height (166) at which the sensor (110 of FIG. 5) is mounted above the ground (168). The microprocessor (150 of FIG. 5) provides various outputs to light emitting diodes, and also receives inputs in addition to those described that include temperature and real time clock pulses. Backup power and circuitry is also included. Such input/output microprocessor information and backup circuitry is well known in the art.

Figure 7:
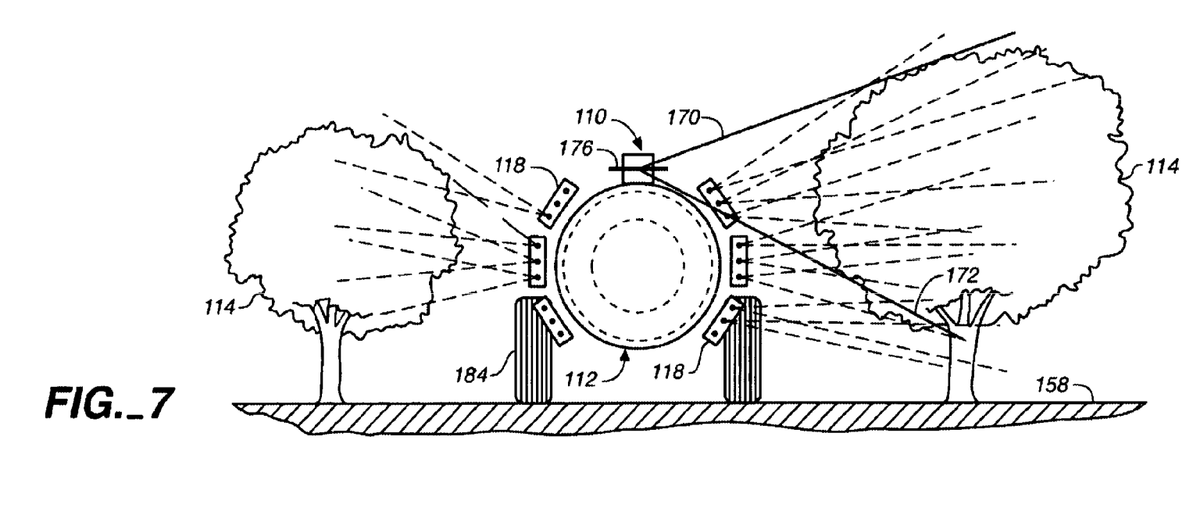
FIG. 7 shows how to determine the range to the top and to the bottom of the target object using the SLS of FIG. 5.

As illustrated in FIG. 7, when the sensor (110) is scanning in the upward direction, the range (170) to the top of the tree (114) is defined as the last valid range received. The range (172) to the bottom of the tree is defined as the first valid range which produces a height above a minimum height threshold (174 of FIG. 6). When the sensor (110) is on a downward scan, the range (170) to the top of the tree (114) is defined as the first valid range received and the range (172) to the bottom of the tree (114) is defined as the last valid range which produces a height above a minimum height threshold (174 of FIG. 6). A valid range is any range less than a predetermined maximum range. Since the sensor (110) is mounted at a fixed height (166 of FIG. 6) above the ground (168 of FIG. 6), the height to the top (162 of FIG. 6) or bottom (172 of FIG. 7) of the target tree (114) can be calculated by multiplying the range measured at a given angle (164 of FIG. 6) by the sine of that angle (164) and adding the height of the sensor (166 of FIG. 6) to that product.

Thus, the height of the object can be calculated as follows:

$$\text{Height(object)} = \text{Height (sensor)} * \text{SIN (Angle)}; \tag{1}$$

where the Range is defined to be less than a predetermined maximum range and the angle (164 of FIG. 6) takes on predetermined values between (−45) degrees and (+45) degrees.

Thus, as it was demonstrated above, the Scanning Laser Sensor (SLS) (110 of FIG. 5) has the three dimensional profile capability and is capable of measuring vectors between the SLS location and a three dimensional point on the surface of a geometrical object at the speed of thousands measurements per second.

In one implementation, the Scanning Laser Sensor (SLS) with three dimensional profile capability has the following parameters: 200 meter range; 2 cm resolution 8 bit using a laser capable of 2 cm resolution; 30 degree dual beams with 10 degree separation.

The Latitude, Longitude and Height of the SLS sensor mounted on a moving unit can be obtained using a SATPS system (see discussion above).

The integration of Latitude, Longitude and Height of the SLS sensor to the laser vectors allows the user to obtain the positional information for all the laser vectors, or cloud of points that are generated, that is allows the implementation of the Positional Reality Image (PRI) of a geometrical object being scanned ('being painted').

One technique to combine each painted point with a current GPS/RTK position of the SLS, is disclosed in the U.S. Pat. No. 5,644,318, entitled "SATPS dynamic surveying from a moving platform",which is incorporated by reference in its entirety in the current patent application.

In the '318 patent, the position-angular determination device was mounted on the targeting device that was used to sight a target. The position-angular determination device was capable of determining the coordinates (X1, Y1, Z1) of the mobile station and the angular coordinates (θ, Φ) of the normal vector to the mobile station. The position-angular determination device was also used to determine the angular coordinates (θ1, Φ1) of the target sighting line from the targeting device to the target.

If the rangefinder was known to be at a location with Cartesian coordinates (X1, Y1, Z1), if the target was known to lie at a distance R from the rangefinder, and if the rangefinder angular orientation with azimuthal angle Φ1 and polar angle Φ1 relative to the X1Y1 plane in this coordinate system, the target coordinates (X2, Y2, Z2) in this system become:

$$X2 = X1 + R \sin(\Phi 1) \sin(\theta 1), \quad (2)$$

$$Y2 = Y1 + R \cos(\Phi 1) \sin(\theta 1), \quad (3)$$

$$Z2 = Z1 + R \cos(\theta 1). \quad (4)$$

Using the above-given formulas (2–4), one can obtain relationship between each painted point (X2, Y2, Z2) and a current GPS/RTK position of the SLS (X1, X2, X3), and therefore after combining two vectors (X1, Y1, Z1) and (X2, Y2, Z2), obtain Latitude, a Longitude and a Height for each painted point.

The data clouds (54 of FIG. 2) comprise a plurality of painted points obtained using a Positional Reality System (10 of FIG. 1) of the present invention.

Figure 8:
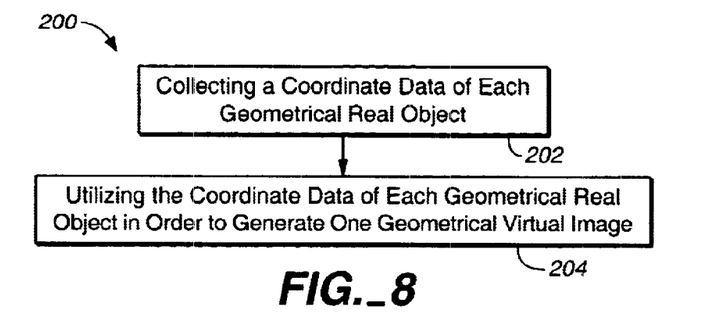
FIG. 8 shows a flowchart of a method of generating a Positional Reality Image (PRI) of at least one real object using a moving platform equipped with an integrated Positional Reality (PR) system of FIG. 1.

FIG. 8 shows a flowchart (200) of a method of generating at least one Positional Reality Image (PRI) of at least one real object using a moving platform equipped with an integrated Positional Reality (PR) (10 of FIG. 1). Each Positional Reality Image (PRI) is an image of one real object.

During the first step (202 of FIG. 8), data of each real object is collected. At the next step (204 of FIG. 8), a Positional Reality Image (PRI) of each real object is generated utilizing its collected set of data.

Figure 9:
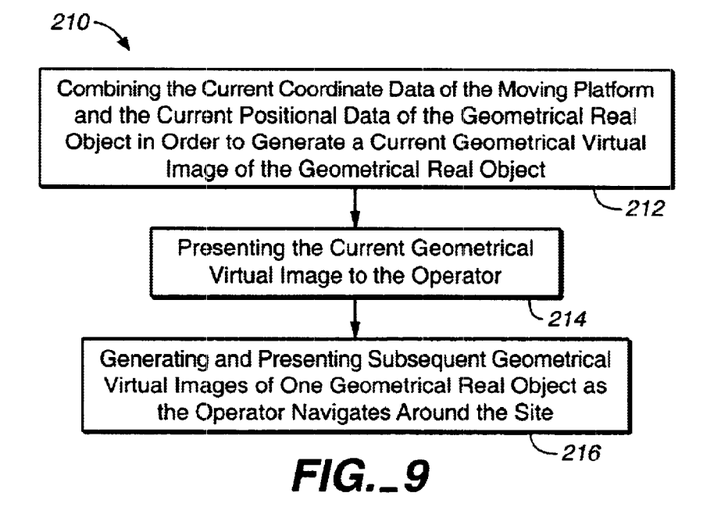
FIG. 9 illustrates a flowchart of a method of generating and viewing a Positional Reality Image (PRI) of each real object.

In one embodiment of the present invention, FIG. 9 shows a flowchart of a method of generating and viewing a Positional Reality Image (PRI) of each real object.

In the first step (212 of FIG. 9), the current set of data of the SLS sensor mounted on a moving platform and the current positional data of the real object are combined in order to generate a current Positional Reality Image (PRI) of the real object. In the next step (214 of FIG. 9), the current Positional Reality Image (PRI) is presented to the operator.

In one embodiment, the current Positional Reality Image (PRI) is presented to the operator on a see-through display.

In another embodiment, the current Positional Reality Image (PRI) is presented to the operator on a telemonitor.

Yet, in one more embodiment of the present invention, the current Positional Reality Image (PRI) is presented to the operator on a laptop computer.

The subsequent Positional Reality Images (PRI) of the same geometrical real can be generated and presented to the operator as the mobile unit navigates around the site (step 216 of FIG. 9).

Figure 10:
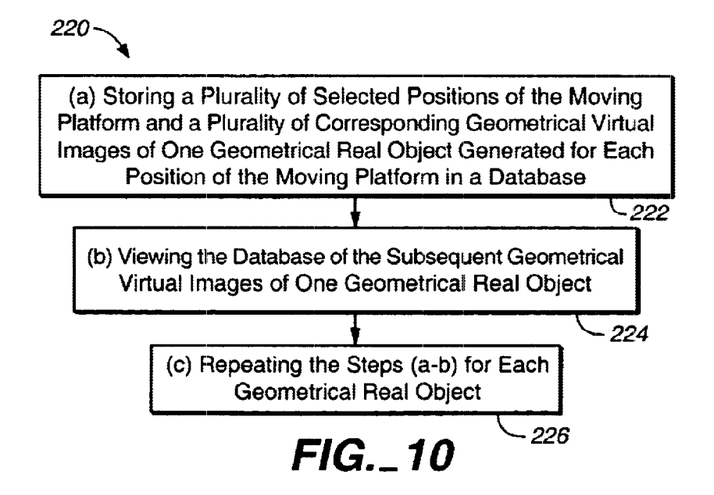
FIG. 10 shows a flowchart of a method for storing and subsequently viewing a plurality of selected positions of the moving platform and a plurality of corresponding Positional Reality Images (PRI) of a real object generated for each position of the moving platform.

In another embodiment of the present invention, as shown in the flowchart of FIG. 10, a plurality of selected positions of the moving platform and a plurality of corresponding Positional Reality Images (PRI) of a real object generated for each position of the moving platform can be stored in a database (step 222 of FIG. 9). This database of the subsequent Positional Reality Images (PRI) of each real object can be viewed by the operator (step 224). The process of viewing the database of subsequent Positional Reality Images (PRI) can be implemented by using a virtual controller to access the database.

This process can be repeated for each real object (step 226).

Thus, each Positional Reality Image (PRI) of a real object is built as a cloud of three-dimensional points covering the surface of the geometrical object. This cloud of three-dimensional points represents a laser photograph of the geometrical object. Thus, the PR system mounted on a moving vehicle 'paints' the surfaces of objects that it passes.

In one embodiment of the present invention, the PR system capable of 'painting' the surfaces of objects that it passes has the following parameters: (1) the data is collected while the moving platform with mounted PR system moves around the cite with the speed of at 30–50 mph; (2) the SLS generates laser scan beam with 30 degree scan beam width; (3) at least 10,000 points of data are collected per second per one laser beam; (4) each painted point is combined with a current GPS/RTK position of the SLS, that is each painted point has a Latitude, a Longitude and a Height.

These dense data clouds give shape to objects and surfaces.

In one embodiment of the present invention, the Positional Reality technology can be used to generate dense clouds of points in order to implement the Geometrical Image System (GIS). The examples are: (1) to inventory roadside furniture for DOTS; (2) position quardrails, signs, and overpasses while gathering data at speeds up to 60 mph; (3) establishing location and spans for power poles; (4) locating trees and buildings for inclusion in virtual reality scenes.

In another embodiment of the present invention, the Positional Reality technology can be used to generate the dense clouds of points for real time surveying and mapping. The examples are: (1) profiling and mapping of right of ways of roads; (2) profiling vertical walls in open pit mines; (3) mapping fronts of buildings for architectural design.

Figure 11:
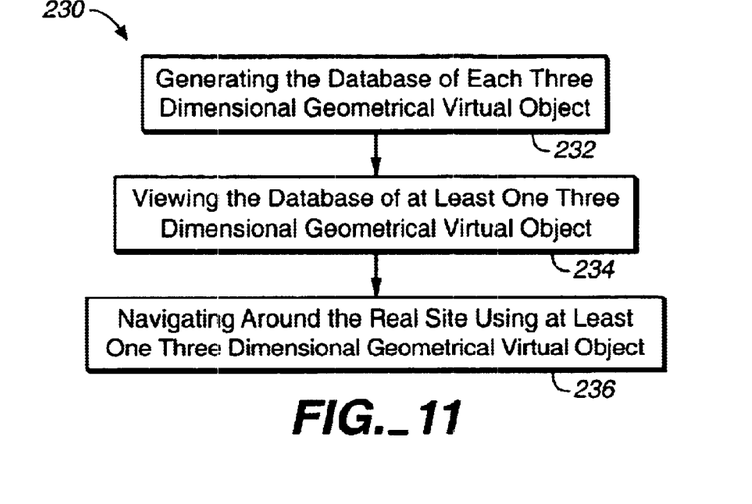
FIG. 11 is a flowchart of a method of navigating around the real site using a database of three dimensional Positional Reality Images (PRI) of geometrical objects that comprise the real site.

In one additional embodiment of the invention, as depicted in the flowchart (230) of FIG. 11, the operator can navigate around the real site using a database of three dimensional Positional Reality Images of the geometrical objects that comprise the real site.

In one embodiment of the present invention, during the night time or in a situation of poor visibility (like a fog), the operator can navigate around the real site without using the night vision gear.

Figure 12:
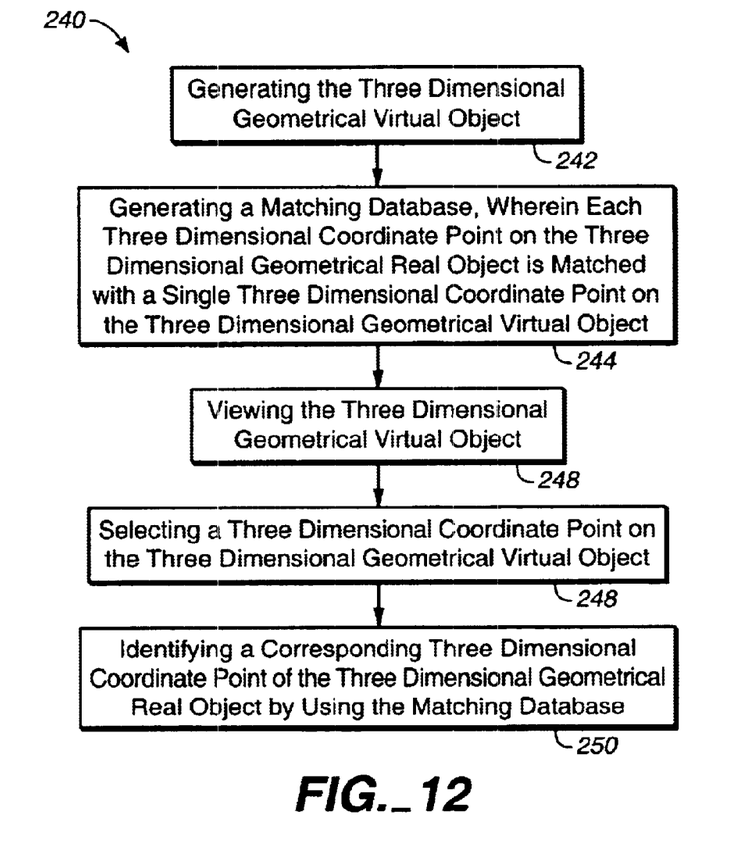
FIG. 12 depicts a flowchart of a method for identifying a three dimensional point on a three dimensional real object by utilizing a three dimensional Positional Reality Image (PRI) of this geometrical object and a matching database.

Yet, in one more embodiment of the present invention, as depicted in the flowchart (240) of FIG. 12, a three dimensional coordinate point on a three dimensional real object can be identified by utilizing a three dimensional Positional Reality Image (PRI) of this geometrical object.

After generating the three dimensional Positional Reality Image (PRI) of the geometrical object (step 242 of FIG. 12), the matching database is generated (step 244 of FIG. 12), wherein each dimensional coordinate point on the three dimensional real object is matched with a single three dimensional coordinate point on the three dimensional Positional Reality Image (PRI) of this geometrical object.

By viewing the three dimensional Positional Reality Image (PRI) of this geometrical object (step 246), the operator can select a three dimensional coordinate point on the three dimensional Positional Reality Image (PRI) of this geometrical object (step 248), and identify a corresponding three dimensional coordinate point of the three dimensional real object by using the matching database (step 250).

The data collection can be simplified and automated by using specialized data collection software packages comprising a data collection software package, a data processing software package, a mapping/three-dimensional viewer software package, and an object recognition software The mapping/three-dimensional viewer software package can be implemented using a terramodel software package, or a terra vista software package.

The object recognition software (CAD Models) can be used to recognize shapes from the point clouds, allowing automatic data basing of objects (highway furniture, poles, signs, etc) without operator intervention.

The conventional surveys with theodolites or GPS systems are used to build databases by tying in a single point on an object rather than attaching dimensions to describe the size and shape of a geometrical object. The ability to match known objects to the clouds of points through object recognition software, will allow the system to build databases of objects many times faster than can be accomplished with traditional survey techniques.

Figure 2:
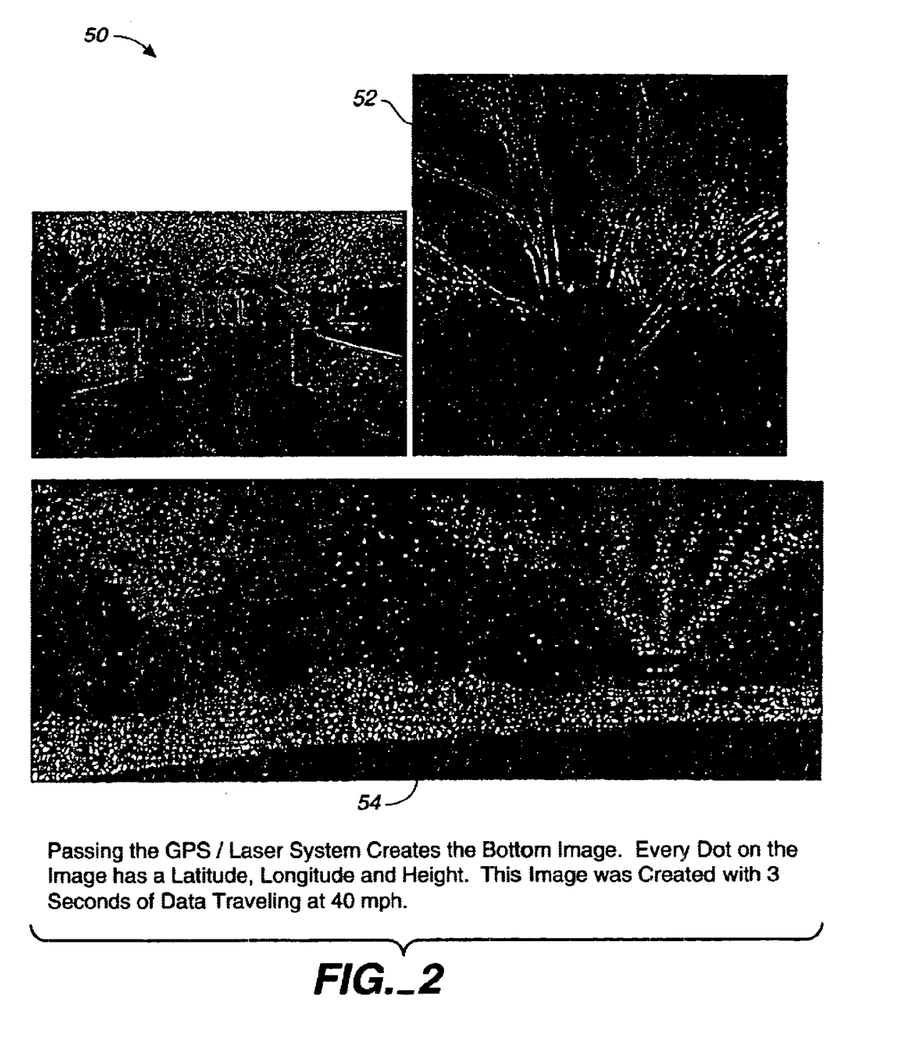
FIG. 2 shows an example of data obtained using the Positional Reality (PR) system of FIG. 1.

FIG. 2 shows an example how a Positional Reality (PR) System (10 of FIG. 1) of the present invention comprising an RTK GPS and SLS system produces clouds of points (54) that attaches dimensions to the image (54) in order to describe the size and shape of a geometrical object (tree 52).

In this particular example, a PR system mounted on a moving vehicle was passing a tree (geometrical object 52) in order to produce a cloud of points (54) that represented a positional reality image of the geometrical object (52). The image (54) was created with 3 seconds of data while a vehicle with the mounted PR system (10 of FIG. 1) comprising an RTK GPS and an SLS system was travelling at 40 mph speed.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. A method of navigating in real time around a real site comprising at least one three dimensional real geometrical object, said method comprising the steps of:

generating in real time a database comprising a set of three dimensional Positional Reality Images of each said three dimensional real object by operating an integrated Positional Reality System (PRI) comprising a positioning system integrated with a scanning optical system;

viewing in real time said database comprising said set of three dimensional Positional Reality Images; and navigating in real time around said real site using said database of said three dimensional Positional Reality Images.

2. The method of claim 1, wherein said step of navigating around the real site using said at least one three dimensional Positional Reality Image (PRI) further comprises the step of:

navigating around the real site in real time in complete darkness.

3. A method of identifying in real time a three dimensional coordinate point on a three dimensional real object by utilizing a three dimensional Positional Reality Image (PRI); said three dimensional Positional Reality Image (PRI) being a three dimensional virtual image of said three dimensional real object, said method comprising the steps of:

generating in real time said three dimensional Positional Reality Image (PRI) of said three dimensional geometrical object;

generating in real time a matching database, wherein each said three dimensional coordinate point on said three dimensional real object is matched with a single three dimensional coordinate point on said three dimensional Positional Reality Image (PRI) of said geometrical object;

viewing in real time said three dimensional Positional Reality Image (PRI) of said geometrical object;

selecting a three dimensional coordinate point on said three dimensional Positional Reality Image (PRI) of said geometrical object; and identifying in real time a corresponding three dimensional coordinate point of said three dimensional real object by using said matching database.

4. The method of claim 3, wherein said step of viewing in real time said three dimensional Positional Reality Image (PRI) of said geometrical object further includes the step of:

accessing in real time said matching database using a virtual controller.

* * * * *